United States Patent
Hezar et al.

(10) Patent No.: US 8,831,085 B2
(45) Date of Patent: Sep. 9, 2014

(54) DIGITAL TIME-INTERLEAVED RF-PWM TRANSMITTER

(75) Inventors: Rahmi Hezar, Allen, TX (US); Lei Ding, Plano, TX (US); Joonhoi Hur, Dallas, TX (US); Baher S. Haroun, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 341 days.

(21) Appl. No.: 13/327,247

(22) Filed: Dec. 15, 2011

(65) Prior Publication Data

US 2013/0156089 A1     Jun. 20, 2013

(51) Int. Cl.
*H03K 7/08* (2006.01)

(52) U.S. Cl.
USPC ............................ 375/238; 375/295

(58) Field of Classification Search
CPC .............. H03F 3/217; H03F 2200/331; H03F 2200/351; H04L 25/4902; H04B 1/02; H04B 1/0483; H04B 3/542
USPC ................................. 375/238, 395
See application file for complete search history.

(56) References Cited

U.S. PATENT DOCUMENTS

| | | | |
|---|---|---|---|
| 6,650,258 B1 * | 11/2003 | Kelly et al. | ...................... 341/61 |
| 7,209,064 B1 | 4/2007 | Gaboriau et al. | |
| 7,327,296 B1 | 2/2008 | Gaboriau et al. | |
| 7,425,853 B2 | 9/2008 | Andersen et al. | |
| 7,729,445 B2 | 6/2010 | Ravi et al. | |
| 7,782,238 B2 | 8/2010 | Lee | |
| 7,830,289 B2 | 11/2010 | Ferri | |
| 2006/0115005 A1* | 6/2006 | Hickling | ........................ 375/247 |
| 2010/0124290 A1* | 5/2010 | Kablotsky | ...................... 375/259 |

FOREIGN PATENT DOCUMENTS

EP      1632073      9/2007

OTHER PUBLICATIONS

"Quadrature Integral Noise Shaping for Generation of Modulated RF Signals", Proceeding of the 45th Midwest Symposium on Circuits and Systems, vol. 2, pp. 537-540 (Midya, et al.), Aug. 4, 2002.
An All-Digital Universal RF Transmitter, IEEE 2004 Custom Integrated Circuits Conference (CICC), pp. 549-552 (Wagh, et al.), Oct. 3, 2004.
U.S. Appl. No. 13/323,511, filed Dec. 12, 2011.

* cited by examiner

*Primary Examiner* — Shuwang Liu
*Assistant Examiner* — David S Huang
(74) *Attorney, Agent, or Firm* — Alan A. R. Cooper; Frederick J. Telecky, Jr.

(57) ABSTRACT

A method for transmitting radio frequency (RF) signals is provided. In-phase (I) and quadrature (Q) signals are received and filtered using sigma-delta modulation. I and Q pulse width modulation signals are generated from the filtered I and Q signals and interleaved so as to generate a time-interleaved signal. The time-interleaved signal is then amplified to generate the RF signals.

8 Claims, 7 Drawing Sheets

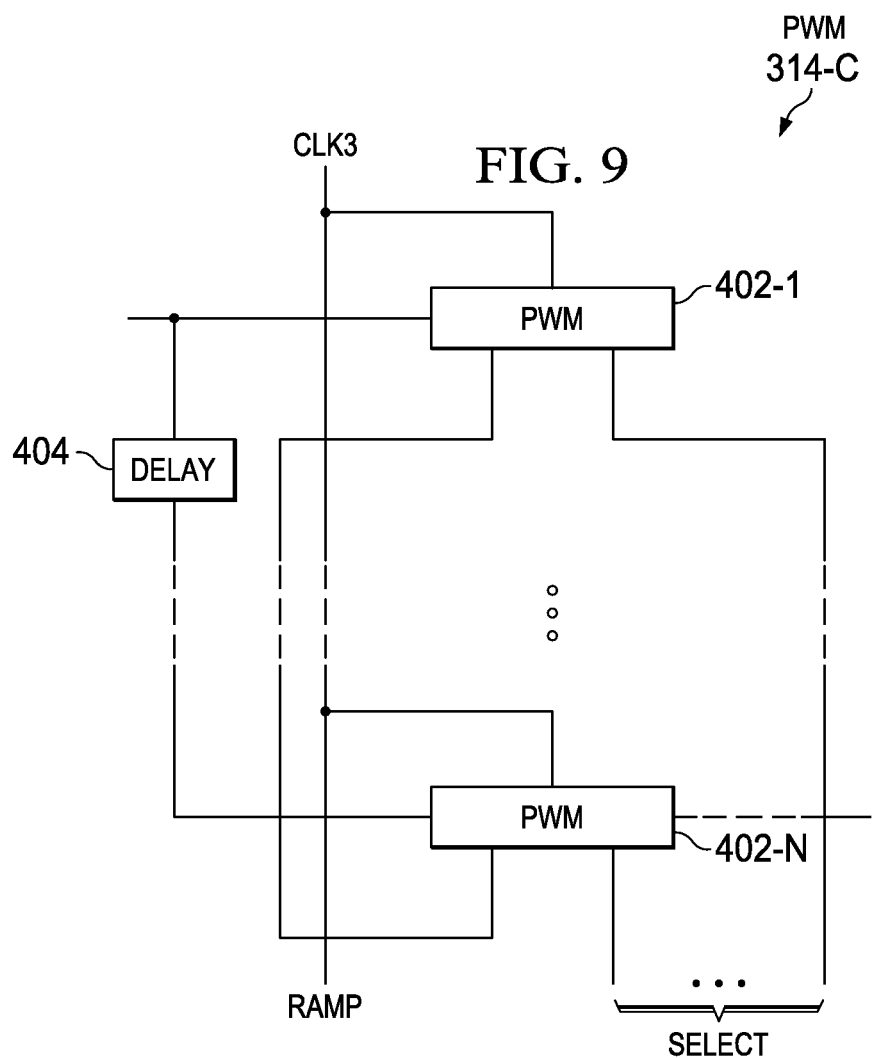

DIGITAL TIME-INTERLEAVED RF-PWM TRANSMITTER

TECHNICAL FIELD

The invention relates generally to radio frequency (RF) transmitters and, more particularly, to RF-pulse width modulation (PWM) transmitters.

BACKGROUND

In many conventional applications, such as wireless local area networks (WLAN) or Long Term Evolution (LTE), signals are operating at low amplitudes, which have high peak-to-average ratios and which cause transmitter performance to suffer. This is in part due to the performance of conventional power amplifiers (PAs) at these peak-to-average ratios, where the power efficiency drops exponentially. This is illustrated in FIG. 1, where the performance of a class AB amplifier, a switching PA, and a Doherty PA are compared. As shown, Doherty PAs have the best performance, but these PAs are bulky (using large power combiners that are not suitable for CMOS processes) and are generally employed in base stations. Switching PAs (which can use polar or linear amplification with nonlinear components (LINC) architectures) have better performance than Class AB PAs, but there are several problems with these architectures as well (such as high sensitivity to delay mismatches and efficiency limitations due to the use of power combiners). As shown, none of these PAs meet the target performance.

There are also a litany of other problems associated with these architectures, and, to illustrate some of the problems associated with these conventional architectures, one may look to fully digital transmitter 100 shown in FIG. 2. In operation, the digital modulator 102 is able to generate in-phase (I) and quadrature (Q) signals for a modulator. In the modulator, the local oscillator (LO) 107 generates an LO signal that is phase shifted by the phase shifting circuit 106 (which is typically a hybrid) so as to provide a 0° phase shifted signal to mixer 104-1 and a 90° phase shifted signal to mixer 104-2. Mixers 104-1 and 104-2 are then able to mix the I and Q signals with the phase shifted LO signals, and the outputs of mixers 104-1 and 104-2 are combined with combiner 108 (which is typically an adder). The output from the modulator is then filtered by the pulse generator 110 (which can, for example, be a 1-bit band-pass sigma-delta modulator (SDM) or a 1-bit carrier pulse modulator) so as to generate signals for the switching PA 112. Some problem with this arrangement are that: (1) when an SDM is used as the pulse generator 110, the load generally includes bulky and expensive analog post-filtering and (2) varying pulse duration during one RF cycle to another can be severely limited.

Therefore, there is a need for an improved RF transmitter.

Some examples of conventional circuits are: U.S. Pat. No. 7,729,445; European Patent No. EP1632073; Midya et al., "Quadrature Integral Noise Shaping for Generation of Modulated RF Signals," *Proceedings of the 45th Midwest Symposium on Circuits and Systems*, Vol. 2, pp. 537-540, 2006; and Wagh et al., "An all-digital universal RF transmitter," Proc. *IEEE Custom Integrated Circuits Conf.* (CICC), p. 549, 2004.

SUMMARY

An embodiment of the present invention, accordingly, provides an apparatus. The apparatus comprises a first sigma-delta modulator (SDM) that is configure to receive an in-phase (I) signal; a second SDM that is configured to receive a quadrature (Q) signal; a first pulse width modulator (PWM) that is coupled to the first SDM; a second PWM that is coupled to the second SDM; an interleaver that is coupled to the first and second PWMs that is configured to combine outputs from the first and second PWMs; and a power amplifier (PA) that is coupled to the interleaver.

In accordance with an embodiment of the present invention, the interleaver further comprises: a first mixer that is configured to receive a first interleaving signal and that is coupled to the first PWM; a second mixer that is configured to receive the a second interleaving signal and that is coupled to the second PWM; and a combiner that is coupled to the first mixer, the second mixer, and the PA.

In accordance with an embodiment of the present invention, the first and second interleaving signals are 90° out-of-phase.

In accordance with an embodiment of the present invention, the apparatus further comprise: a first repeater that is coupled between the first PWM and the first mixer; and a second repeater that is coupled between the second PWM and the second mixer.

In accordance with an embodiment of the present invention, the first and second SDMs are configured to receive a first clock signal, and wherein the first and second PWMs are configured to receive a second clock signal, and wherein the first and second repeaters are configured to receive a third clock signal.

In accordance with an embodiment of the present invention, the first, second, and third clock signals have first, second, and third frequencies, and wherein the second frequency is twice the first frequency, and wherein the third frequency is twice the second frequency.

In accordance with an embodiment of the present invention, the apparatus further comprises a digital modulator that is configured to generate I and Q signals.

In accordance with an embodiment of the present invention, a method is provided. The method comprises receiving I and Q signals; filtering the I and Q signals using sigma-delta modulation; generating I and Q pulse width modulation signals from the filtered I and Q signals; interleaving the I and Q pulse width modulation signals so as to generate a time-interleaved signal; and amplifying the time-interleaved signal.

In accordance with an embodiment of the present invention, the step of interleaving further comprises: mixing the I pulse width modulation signal with a first interleaving signal; mixing the Q pulse width modulation signal with a second interleaving signal; and combining the mixed I and Q pulse width modulation signals to generate the time-interleaved signal.

In accordance with an embodiment of the present invention, the steps of mixing and combining the mixed I and Q pulse width modulation signals further comprise: outputting, during a first period of the first and second interleaving signals, the I pulse width modulation signal; outputting, during a second period of the first and second interleaving signals, the Q pulse width modulation signal; outputting, during a third period of the first and second interleaving signals, an inverse of the I pulse width modulation signal; and outputting, during a fourth period of the first and second interleaving signals, an inverse of the Q pulse width modulation signal.

In accordance with an embodiment of the present invention, the step of filtering is performed using a first clock signal having a first frequency, and wherein the step of generating the I and Q pulse width modulation signals is performed using a second clock signal having a second frequency, and wherein the second frequency is greater than the first frequency.

In accordance with an embodiment of the present invention, the second frequency is twice the first frequency, wherein the method further comprises, prior to the step of interleaving, retransmitting the I and Q pulse width modulation signals using a third clock signal having a third frequency, wherein the third frequency is twice the second frequency.

In accordance with an embodiment of the present invention, an apparatus is provided. The apparatus comprises a digital modulator that is configured to generate I and Q signals; a first SDM that is coupled to the digital modulator so as to receive the I signal; a second SDM that is coupled to the digital modulator so as to receive the Q signal; a first PWM that is coupled to the first SDM; a second PWM that is coupled to the second SDM; an interleaver that is coupled to the first and second PWMs that is configured to combine outputs from the first and second PWMs; and a switching PA that is coupled to the interleaver.

In accordance with an embodiment of the present invention, the first and second SDM further comprise first and second sets of cascaded SDMs.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 9 is a diagram of an example of a PWM of FIG. 8.

DETAILED DESCRIPTION

Figure 1:
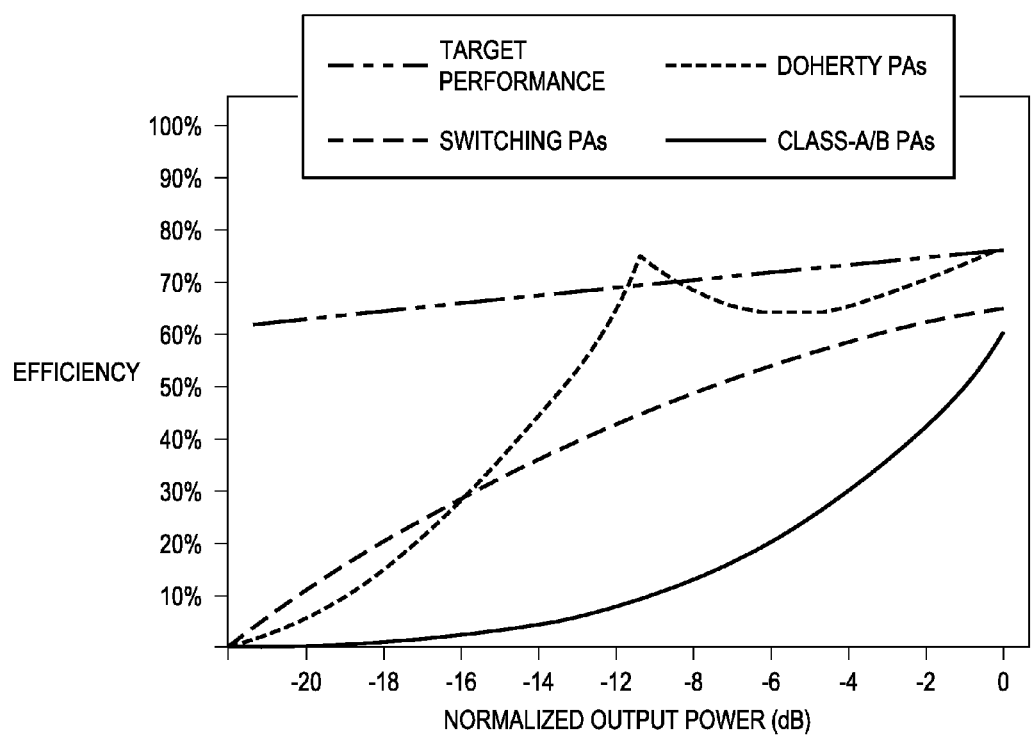
FIG. 1 is a diagram comparing the power efficiencies of several conventional PAs.

Refer now to the drawings wherein depicted elements are, for the sake of clarity, not necessarily shown to scale and wherein like or similar elements are designated by the same reference numeral through the several views.

Figure 2:
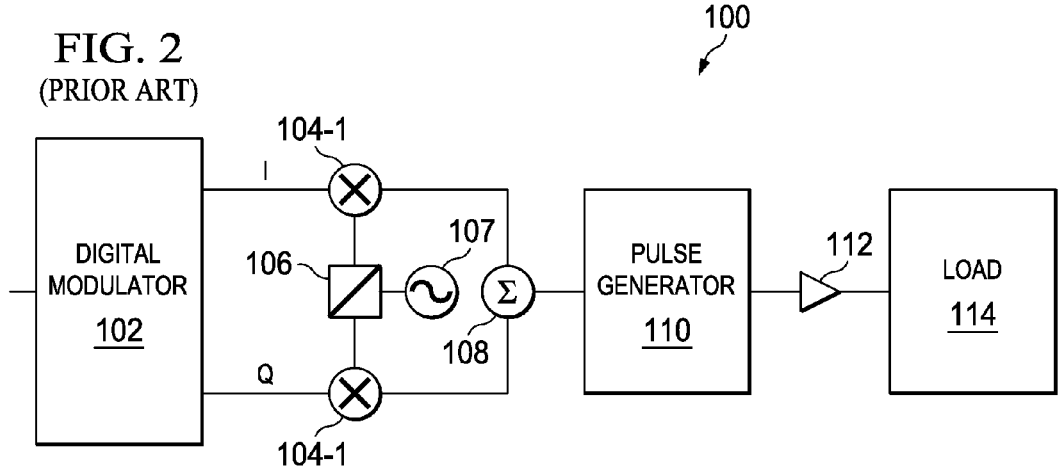
FIG. 2 is a diagram of an example of a conventional digital transmitter.
Figure 3:
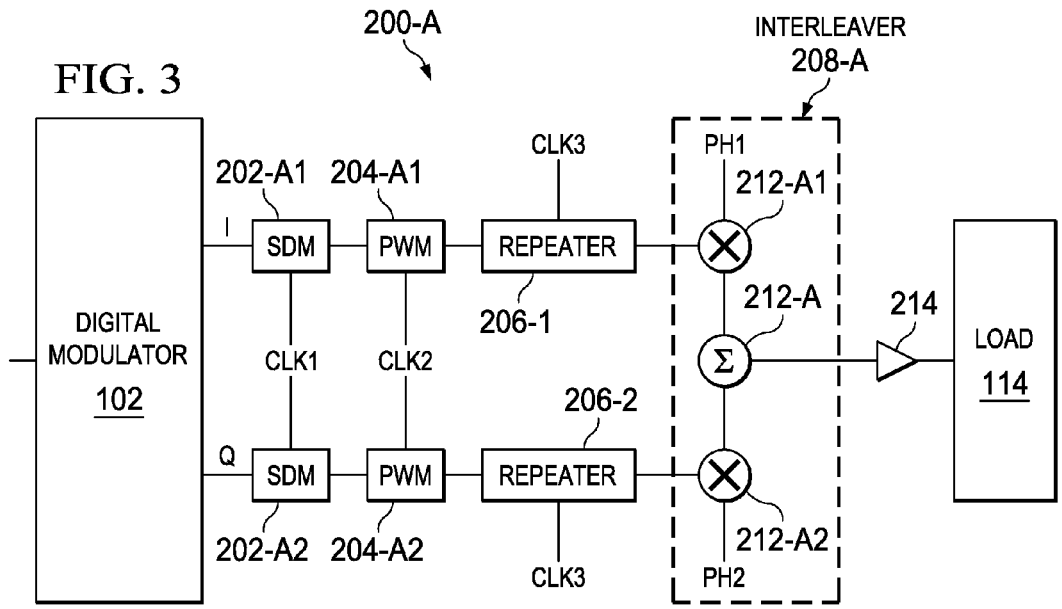
FIGS. 3 and 8 are diagrams of examples of a digital transmitter in accordance with the present invention.
Figure 4:
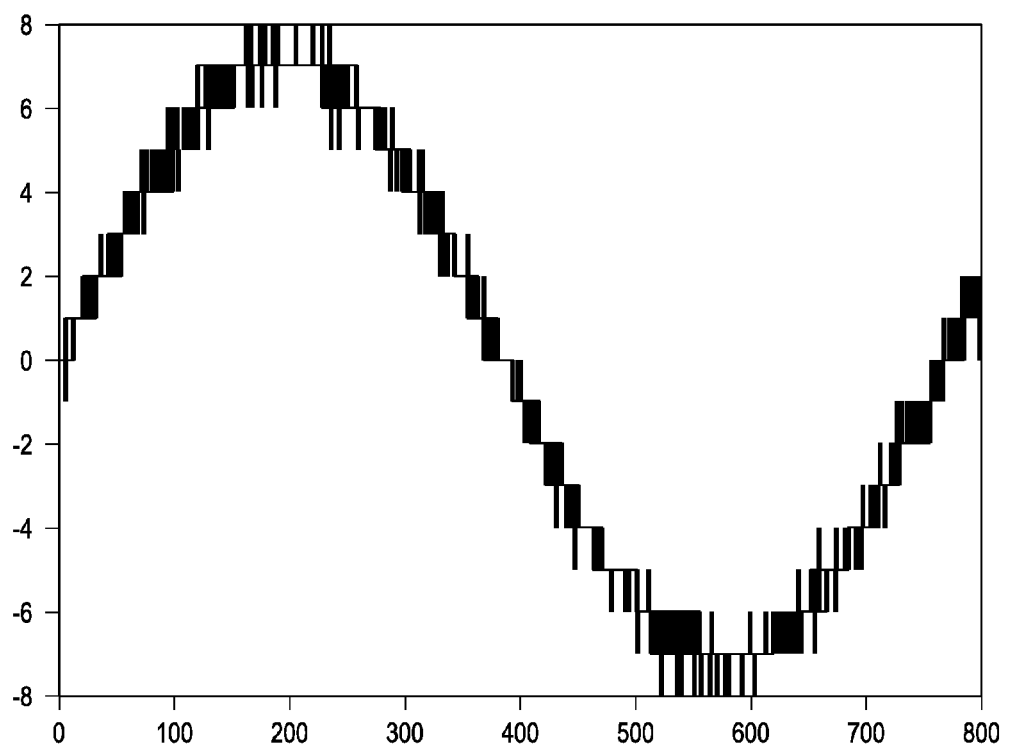
FIGS. 4-6 are waveforms for the transmitter of FIG. 3.
Figure 5:
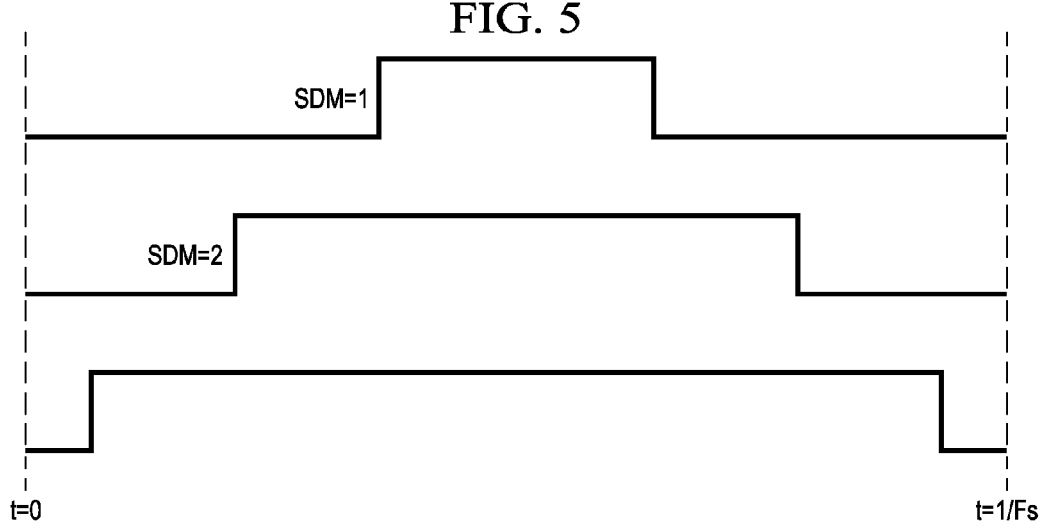

Turning to FIG. 3-6, an example of a digital transmitter 200-A in accordance with the present invention can be seen. As shown, the digital modulator 102 is able to generate I and Q signals (similar to FIG. 2 above). SDMs 202-A1 and 202-A2 (which are typically low-pass multi-bit SDMs having M output levels) respectively receive the I and Q signals from the digital modulator 102. These SDMs 202-A1 and 202-A2 are generally clocked by clock signal CLK1 (which can, for example, have a frequency $F_s$) to filter the I and Q signals so as to reduce the number of bits used to represent the I and Q signal with some out-of-band noise (which can be seen in FIG. 4). The pulse width modulators or PWMs 204-A1 and 204-A2 (which can, for example, be low-pass PWMs) receive the filtered I and Q signals from SDMs 202-A1 and 202-A2 and, for example, translate the amplitude quantized multilevel signals from SDMs 202-A1 and 202-A2 to a single-bit or 3-level time-quantized signal (effectively generating I and Q PWM signals). To accomplish this, the PWMs 204-A1 and 204-A2 use clock signal CLK2 (which, for example, can have a frequency of $MF_s$, where M is the number of levels in SDM outputs). Repeaters 206-1 and 206-2 are then able to retransmit the I and Q PWM signals using the clock signal CLK3 (which can, example, $2MF_s$). Repeaters 206-1 and 206-2 may also be omitted, and, for this arrangement, PWMs 204-A1 and 204-A2 would use clock signal CLK3. As a general rule, the frequency of clock signal CLK3 is set at a frequency to accommodate the interleaver 208-A and is related to the number of levels of the SDMs 202-A1 and 202-A2; for example, the frequency of clock signal CLK3 is two times the number of levels M times the frequency of clock signal CLK (or $F_{CLK3}=2MF_s$). It is also related to the carrier frequency $F_C$ of the RF signal, i.e., $F_{CLK3}=4F_C$. An example of the output waveforms for repeaters 206-1 and 206-2 can be seen in FIG. 5.

Figure 6:
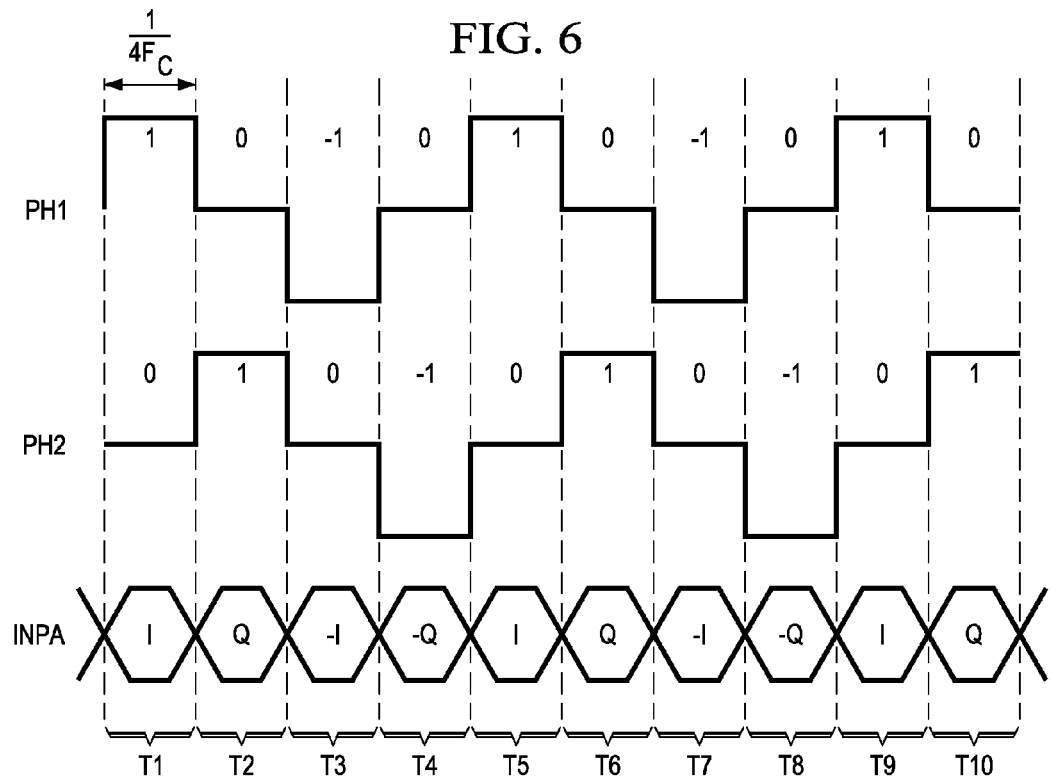

Once the I and Q signals have been shaped, these I and Q signals can be interleaved and amplified. Interleaving is generally accomplished with interleaver 208-A (which generally comprises mixers 212-A1 and 212-A2 and combiner or adder 210-A) that interleaves the I and Q signals into a single stream using interleaving signals PH1 and PH2. As shown in the example of FIG. 6, the interleaving signals PH1 and PH2 have a cycle of 0→1→0→-1→0 and are 90° out-of-phase with one another. In period T1, signals PH1 and PH2 are 1 and 0, respectively, which allows the I signal to be provided as signal INPA to PA 214. In period T2, signals PH1 and PH2 are 0 and 1, respectively, allowing the Q signal to be provided as signal INPA. In period T3, signals PH1 and PH2 are −1 and 0, respectively, allowing an inverse of the I signal to be provided as signal INPA. Similarly, for period T4, an inverse of the Q signal is provided as signal INPA, and a similar result is shown for periods T5 to T10. As shown in this example, each period T1 to T10 is ¼$F_C$. Interleaved signal INPA can then be used to directly drive the PA 214 (which is a digital PA) directly.

Figure 7:
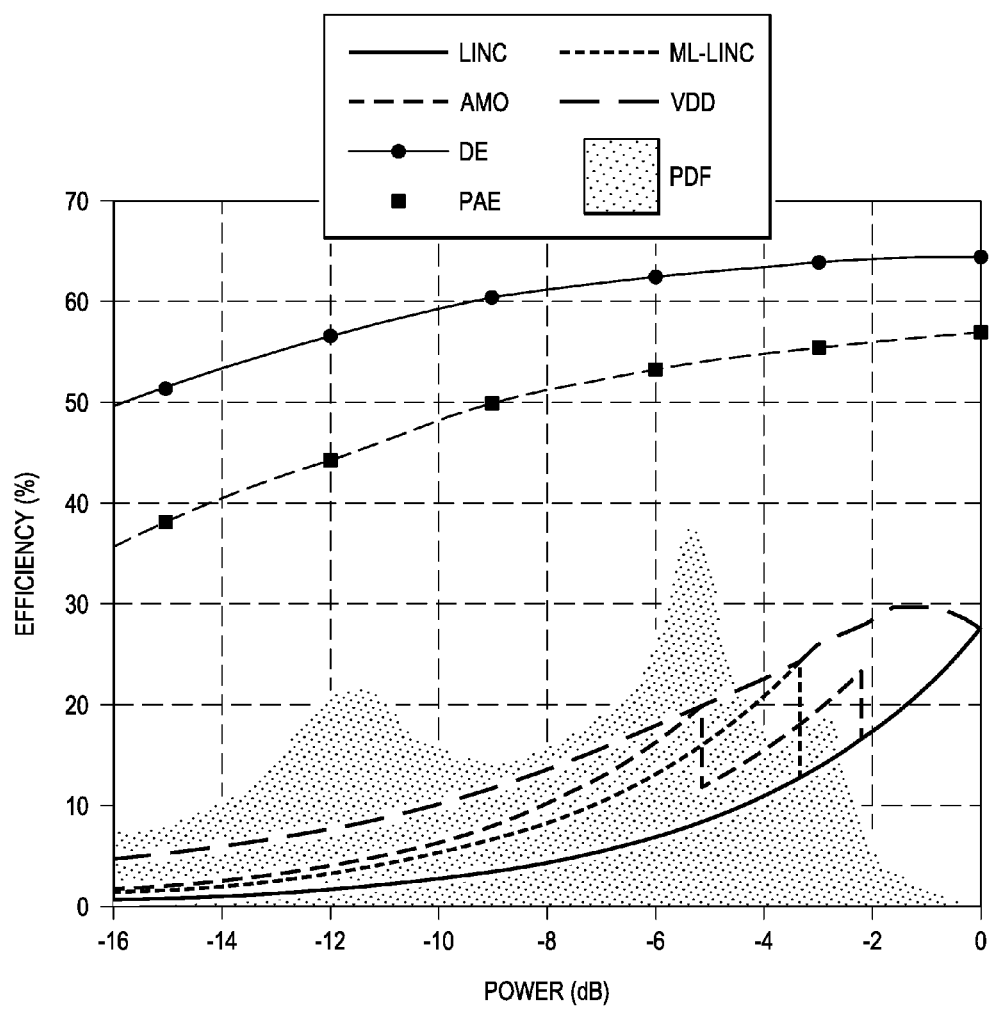
FIG. 7 is a diagram showing the power efficiency of the transmitter of FIG. 3 with transmitters employing PAs of varying architectures.

As a result of using the transmitter 200 several advantages can be realized. Because transmitter 200 is a fully digital transmitter, it does not use an analog power combiner and is not limited by the inherent inefficiencies and high costs and process requirements. RF pulse widths do not jump between cycles, and the switching PA 214 can be optimized to operate at the expected input digital waveform. Coding efficiency, which is generally a measure total number of switching instances per signal period or a measure of in-band power to total-power, is close an ideal square wave (e.g. 0.79%). Dynamic errors in the switching PAs also become a predictable additive error in the transmitter 200 and, thus, have the potential to be corrected with pre-distortion or simple loopback circuits. Additionally, as shown in FIG. 7, the efficiency of transmitter 200 is dramatically improved over transmitters employing various conventional PA architectures and is close to the target efficiency shown in FIG. 1. In this example comparison, the power added efficiency (PAE) and digital efficiency (DE) for transmitter 200 are compared to the efficiencies of an Asymmetric Multilevel Outphasing (AMO)

PA, a LINC PA, a multi-level LINC (ML-LINC), and polar PA (labeled VDD) for an amplitude probability display function (PDF).

Figure 8:
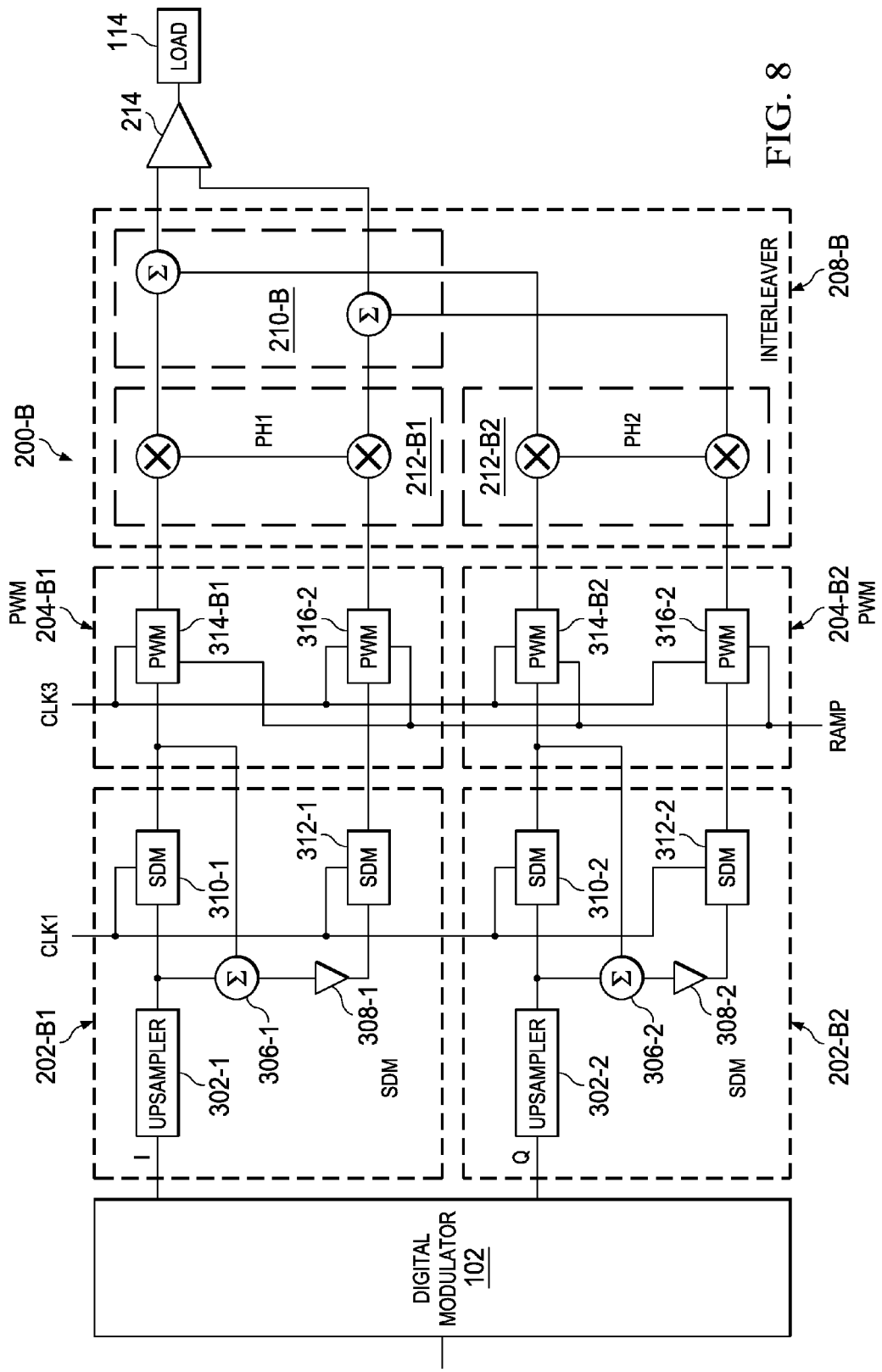

Alternatively, SDMs 202-A1 and 202-A2 can be replaced with cascaded SDMs 202-B1 and 202-B2, as shown in transmitter 202-B of FIG. 8. The cascaded SDMs 202-B1 and 202-B2 can be used to reduce the out-of-band noise and meet spectral shaping for a particular standard. To do this, SDMs 202-B1 and 202-B2 respectively comprise an upsamplers 302-1 and 302-2, subtractors 306-1 and 306-2, SDMs 310-1, 312-1, 310-2, and 312-2 (with each, for example, having M levels at frequency $F_s$). Since the cascaded SDMs 202-B1 and 202-B2 have separate SDMs 310-1, 312-1, 310-2, and 312-2, PWMs 204-B1 and 204-B2 are also spit, including PWMs 314-B1, 316-B1, 314-B2, and 316-B2, that receive signal RAMP. Generally, a phase select signal (not shown in FIG. 8 for the sake of simplicity of illustration) selects the phases generated by the SDMs 310-1, 312-1, 310-2, and 312-2 and PWMs 314-B1, 316-B1, 314-B2, and 316-B2 to allow for phase averaging to be performed. A more detailed description of this type of phase averaging can be found in co-pending U.S. patent application Ser. No. 13/323,511, which is entitled "PHASE AVERAGED PULSE WIDTH MODULATOR," which was filed on Dec. 11, 2011, and which is incorporated by reference herein for all purposes. Interleaver 208-B also includes modified mixers 212-B1 and 212-B2 (which each include two mixers for this example) and a modified adder 210-B (which includes two adders for this example) so as to interleave the outputs from PWMs 204-B1 and 204-B2. It should also be noted that transmitter 202-B can include repeaters (similar to repeaters 206-1 and 206-2) so as to allow PWMs 204-B1 and 204-B2 to use clock signal CLK2, but these repeaters have been omitted from FIG. 8 in this example. Moreover, in yet another alternative, PWMs 314-B1 and 314-B2 (which is labeled 314-C in FIG. 9) can be split into multiple PWMs 402-1 to 402-N. The input between each PWMs 402-1 to 402-N is delayed by a delay 404 (only one is shown for the sake of simplicity of illustration), and as described in co-pending U.S. patent application Ser. No. 13/323,511, select signal SELECT can be used to select a phase to provide phase averaging over an increased number of phases.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus comprising:
    a first sigma-delta modulator (SDM) that is configured to receive an in-phase (I) signal;
    a second SDM that is configured to receive a quadrature (Q) signal;
    a first pulse width modulator (PWM) that is coupled to the first SDM;
    a second PWM that is coupled to the second SDM;
    an interleaver that is coupled to the first and second PWMs that is configured to combine outputs from the first and second PWMs; and
    a power amplifier (PA) that is coupled to the interleaver, wherein the interleaver further comprises:
        a first mixer that is configured to receive a first interleaving signal and that is coupled to the first PWM;
        a second mixer that is configured to receive the a second interleaving signal and that is coupled to the second PWM; and
        a combiner that is coupled to the first mixer, the second mixer, and the PA wherein the first and second interleaving signals are 90° out-of-phase,
    wherein the apparatus further comprises:
        a first repeater that is coupled between the first PWM and the first mixer; and
        a second repeater that is coupled between the second PWM and the second mixer,
    wherein the first and second SDMs are configured to receive a first clock signal, and wherein the first and second PWMs are configured to receive a second clock signal, and wherein the first and second repeaters are configured to receive a third clock signal, and
    wherein the first, second, and third clock signals have first, second, and third frequencies, and wherein the second frequency is twice the first frequency, and wherein the third frequency is twice the second frequency.

2. The apparatus of claim 1, wherein the apparatus further comprises a digital modulator that is configured to generate I and Q signals.

3. A method comprising:
    receiving I and Q signals;
    filtering the I and Q signals using sigma-delta modulation;
    generating I and Q pulse width modulation signals from the filtered I and Q signals;
    interleaving the I and Q pulse width modulation signals so as to generate a time-interleaved signal; and
    amplifying the time-interleaved signal,
    wherein the step of interleaving further comprises:
        mixing the I pulse width modulation signal with a first interleaving signal;
        mixing the Q pulse width modulation signal with a second interleaving signal; and
        combining the mixed I and Q pulse width modulation signals to generate the time-interleaved signal,
    wherein the steps of mixing and combining the mixed I and Q pulse width modulation signals further comprise:
        outputting, during a first period of the first and second interleaving signals, the I pulse width modulation signal;
        outputting, during a second period of the first and second interleaving signals, the Q pulse width modulation signal;
        outputting, during a third period of the first and second interleaving signals, an inverse of the I pulse width modulation signal; and
        outputting, during a fourth period of the first and second interleaving signals, an inverse of the Q pulse width modulation signal.

4. The method of claim 3, wherein the step of filtering is performed using a first clock signal having a first frequency, and wherein the step of generating the I and Q pulse width modulation signals is performed using a second clock signal having a second frequency, and wherein the second frequency is greater than the first frequency.

5. The method of claim 4, wherein the second frequency is twice the first frequency, wherein the method further comprises, prior to the step of interleaving, retransmitting the I and Q pulse width modulation signals using a third clock signal having a third frequency, wherein the third frequency is twice the second frequency.

6. An apparatus comprising:
a digital modulator that is configured to generate I and Q signals;
a first sigma-delta modulator (SDM) that is coupled to the digital modulator so as to receive the I signal;
a second that is coupled to the digital modulator so as to receive the Q signal;
a first pulse width modulator (PWM) that is coupled to the first SDM;
a second PWM that is coupled to the second SDM;
an interleaver that is coupled to the first and second PWMs that is configured to combine outputs from the first and second PWMs; and
a switching PA that is coupled to the interleaver,
wherein the interleaver further comprises:
a first mixer that is configured to receive a first interleaving signal and that is coupled to the first PWM;
a second mixer that is configured to receive the a second interleaving signal and that is coupled to the second PWM; and
a combiner that is coupled to the first mixer, the second mixer, and the PA,
wherein the first and second interleaving signals are 90° out-of-phase,
wherein the apparatus further comprise:
a first repeater that is coupled between the first PWM and the first mixer; and
a second repeater that is coupled between the second PWM and the second mixer,
wherein the first and second SDMs are configured to receive a first clock signal, and wherein the first and second PWMs are configured to receive a second clock signal, and wherein the first and second repeaters are configured to receive a third clock signal,
wherein the first, second, and third clock signals have first, second, and third frequencies, and wherein the second frequency is twice the first frequency, and wherein the third frequency is twice the second frequency.

7. The apparatus of claim 6, wherein the apparatus further comprises a digital modulator that is configured to generate I and Q signals.

8. The apparatus of claim 7, wherein the first and second SDM further comprise first and second sets of cascaded SDMs.

* * * * *